(12) United States Patent
Stefani

(10) Patent No.: US 10,923,985 B2
(45) Date of Patent: Feb. 16, 2021

(54) WIPER MOTOR AND METHOD FOR THE PRODUCTION OF A WIPER MOTOR

(71) Applicant: Valeo Systèmes d'Essuyage, Le Mesnil Saint Denis (FR)

(72) Inventor: Siegfried Stefani, Bietigheim-Bissingen (DE)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 91 days.

(21) Appl. No.: 15/839,107

(22) Filed: Dec. 12, 2017

(65) Prior Publication Data
US 2018/0166944 A1 Jun. 14, 2018

(30) Foreign Application Priority Data
Dec. 12, 2016 (DE) .......................... 10 2016 124 039

(51) Int. Cl.
*H02K 5/24* (2006.01)
*H02K 15/14* (2006.01)
*B60S 1/34* (2006.01)
*B60S 1/00* (2006.01)

(52) U.S. Cl.
CPC .............. *H02K 5/24* (2013.01); *B60S 1/3493* (2013.01); *H02K 15/14* (2013.01); *B60S 1/00* (2013.01)

(58) Field of Classification Search
CPC ........ H02K 5/24; H02K 15/14; B60S 1/3493; B60S 1/00
USPC ............................................................ 310/51
See application file for complete search history.

(56) References Cited

U.S. PATENT DOCUMENTS

| 3,699,605 A | * | 10/1972 | Bellware | ................... B60S 1/08 |
| | | | | 15/250.17 |
| 5,655,405 A | * | 8/1997 | Lerouge | .................. B60S 1/166 |
| | | | | 15/250.3 |
| 5,661,352 A | * | 8/1997 | Oguchi | ................... H02K 5/225 |
| | | | | 310/156.26 |

(Continued)

FOREIGN PATENT DOCUMENTS

| DE | 4229495 C1 | 11/1993 |
| DE | 69103491 T2 | 12/1994 |

(Continued)

OTHER PUBLICATIONS

Search Report issued in corresponding German Application No. 10 2016 124 039.7, dated Jul. 11, 2017 (7 pages).

*Primary Examiner* — John K Kim
(74) *Attorney, Agent, or Firm* — Osha Bergman Watanabe & Burton LLP

(57) ABSTRACT

The invention relates to a wiper motor (10), with a shaft (28) for driving a wiper arm (1), wherein the shaft (28) projects through an opening (29) of a housing (15) and wherein in the region of the opening (29) the shaft (28) is mounted radially in a bore in an at least substantially sleeve-shaped element (30; 30*a*), wherein the sleeve-shaped element (30; 30*a*) is fixed at least axially in the region of the housing (15), and wherein the sleeve-shaped element (30; 30*a*) has at least two different cross-sections (33; 33*a*, 34), a first cross-section (33; 33*a*) which is designed to protrude axially at least through the opening (29) and a second cross-section (34) which is designed to be axially fixed within said opening (29) or within a receiving space (25) of said housing (15).

15 Claims, 4 Drawing Sheets

(56) References Cited

U.S. PATENT DOCUMENTS

Figure 1:
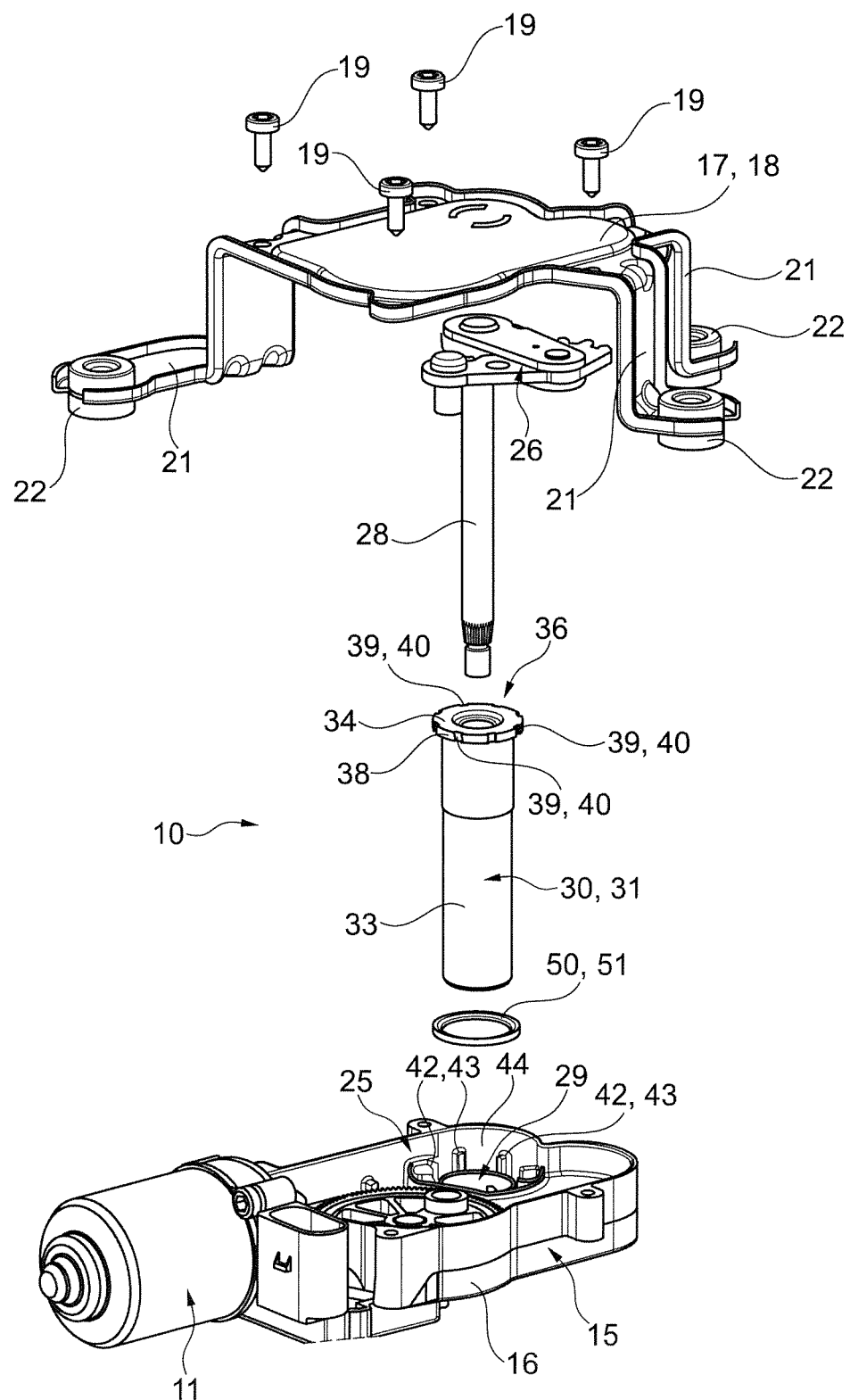

| | | | | |
|---|---|---|---|---|
| 5,735,171 | A * | 4/1998 | Moote | B60S 1/34 15/250.31 |
| 5,820,104 | A * | 10/1998 | Koyano | F16K 51/02 251/326 |
| 6,317,918 | B1 * | 11/2001 | Kagawa | B60S 1/0488 15/250.3 |
| 6,513,186 | B1 * | 2/2003 | Zimmer | B60S 1/0402 15/250.3 |
| 6,842,939 | B1 * | 1/2005 | Hasegawa | B60S 1/0488 15/250.3 |
| 2005/0097699 | A1 * | 5/2005 | Yagi | F16D 7/044 15/250.3 |
| 2005/0264113 | A1 * | 12/2005 | Suzuki | F16K 31/04 310/80 |
| 2008/0209661 | A1 * | 9/2008 | Benner | B60S 1/0488 15/250.31 |
| 2010/0001593 | A1 * | 1/2010 | Reith | B60S 1/3493 310/37 |
| 2013/0255408 | A1 * | 10/2013 | Tokizaki | B60S 1/08 74/42 |
| 2014/0368072 | A1 * | 12/2014 | Heuberger | B60S 1/08 310/83 |
| 2015/0180290 | A1 * | 6/2015 | Yin | H02K 1/187 310/91 |
| 2018/0166944 | A1 * | 6/2018 | Stefani | B60S 1/3493 |

FOREIGN PATENT DOCUMENTS

| | | |
|---|---|---|
| DE | 102005019501 A1 | 11/2006 |
| DE | 102013212040 A1 | 1/2015 |
| DE | 102015122094 A1 | 6/2017 |

* cited by examiner

WIPER MOTOR AND METHOD FOR THE PRODUCTION OF A WIPER MOTOR

PRIOR ART

The invention relates to a wiper motor and to a method for the production of a wiper motor according to the invention.

Wiper motors, as are arranged in particular in the rear region of a vehicle, customarily have a gear housing which is composed of metal, with an opening through which an output shaft of the wiper motor, the output shaft being connectable to a wiper arm, projects. The output shaft is mounted radially here in the region of the opening of the gear housing (DE 10 2005 019 501 A1). It is essential here that, in addition to the radial mounting in the region of the opening, the mounting has at the same time to be formed in such a manner that no moisture or particles can enter the interior space of the gear housing. For the mounting, use is made of a sleeve-shaped element, which is composed of plastic and is designed as an injection-moulded part, as the radial bearing element. For the mounting from the outside of the gear housing, said "guide sleeve" is pressed into the opening of the gear housing and is optionally additionally connected to the gear housing by means of fastening means, such as screws, clip elements or the like. The known guide sleeve is therefore configured in a relatively complicated manner and the mounting is relatively complex.

Furthermore, it is known from the applicant's subsequently published DE 10 2015 122 094 A1, for elimination of the abovementioned disadvantage, to design the guide sleeve in such a manner that the latter can be introduced from the inside of the gear housing into the passage opening, through which the output shaft also projects. In contrast to the prior art explained above, it is therefore no longer required to fasten or to fix the guide sleeve from the outside.

DISCLOSURE OF THE INVENTION

The wiper motor according to the invention with the features of Claim 1 has the advantage that, in addition to simplified mounting, a defined axial positioning of the guide sleeve in the region of the passage opening of the gear housing is furthermore made possible in order to compensate for "axial" component tolerances, wherein furthermore very simple mounting from the inside of the gear housing is made possible at the same time. As a result, inter alia, noises which may otherwise occur due to an axial play of the guide sleeve can be avoided.

The invention is based on the concept of arranging an elastic deformable compensating element between the sleeve-shaped element (guide sleeve) and the "gear" housing, said compensating element being designed to compensate for an axial play which may be present in the longitudinal direction of the sleeve-shaped element between the housing and the sleeve-shaped element. Without a compensating element of this type, there is the possibility that the sleeve-shaped element will otherwise move to and fro in the axial direction because of the component tolerances since, in order to obtain as simple a mounting as possible, without a tool, it is desirable to provide a loose fit between the passage opening in the housing and the outer circumference of the sleeve-shaped guide element. Furthermore, vibrations or shock also transmitted, for example, to the guide sleeve can be absorbed via a compensating element of this type without components being damaged.

Advantageous developments of the wiper motor according to the invention are listed in the dependent claims. All combinations of at least two of the features disclosed in the claims, the description and/or the figures fall within the scope of the invention.

In structurally preferred refinements of the compensating element, the latter is in each case ring-shaped, wherein the compensating element either radially embraces the sleeve-shaped element in the area of the cross-section which does not serve for the axial fixing of the sleeve-shaped element, or is located at a front side of the sleeve-shaped element or lies against said front side.

There are also different possibilities in respect of the material for the compensating element, depending on specific requirements. The compensating element can thus consist, for example, of metal, in which case said compensating element is then in particular formed as a spring washer. Alternatively, said compensating element can be formed as an O ring and can be composed of a rubber-elastic material.

In order to weaken the transition region in the gear housing between the receiving region for the gear and a stub-shaped extension, in which the sleeve-shaped element is arranged, as little as possible with regard to the recesses provided for the form-fitting design of the reception for the sleeve-shaped element, it can furthermore be provided that the opening for the sleeve-shaped element forms a part of the receiving space of the housing on the side facing the cross-section, said cross-section being designed to be axially fixed within said opening.

In a specific structural development of the last-mentioned proposal, it is provided that the receiving space has a fastening area for the second cross-section of the sleeve-shaped element, and that the fastening area has at last one projection which extends radially inwards, preferably formed as a rib, which projection cooperates in a form-fitting manner with a reception located at the second cross-section of the sleeve-shaped element.

So that the projection is arranged only on the region relevant to the sleeve-shaped element, in order to restrict the size of the receiving space in the gear housing as little as possible, it is furthermore provided, in a further structurally preferred refinement, that the at least one projection extends only over a part of the height of the receiving space.

Different variants are also conceivable in respect of the structural refinement of the sleeve-shaped element. It is thus either possible for the sleeve-shaped element to project with an axial partial portion out of the housing, or else for the sleeve-shaped element to be entirely arranged within the housing.

In order, during the mounting, to be able to exert a required axial prestress on the compensating element without separate mounting steps or components being required for this purpose, it can furthermore be provided that the compensating element lies at least indirectly against a housing element, in particular against a cover element, and is loaded axially with a deforming force.

The invention furthermore relates to a method for the production of a wiper motor described to this extent, wherein the sleeve-shaped element is introduced into the opening of the housing up to an axial intermediate position. The method is distinguished according to the invention in that the introducing of the sleeve-shaped element into the opening of the housing takes place from a side forming an interior space of the housing, and that before the introducing of the sleeve-shaped element into the opening the compensating element is positioned on the first cross-section of the sleeve-shaped element or else that the compensating element is introduced into the opening in the housing.

In order to generate the axial prestressing force on the compensating element and therefore in order to compensate for tolerances of the components and in order to ensure axial freedom from play of the sleeve-shaped element, a development of the method described to this extent makes provision that after the introducing of the sleeve-shaped element into the axial intermediate position, the compensating element is elastically deformed by mounting a housing element, especially a housing cover, thereby moving the sleeve-shaped element into an axial end position.

Further advantages, features and details of the invention emerge from the description of preferred exemplary embodiments and with reference to the drawing.

Figure 4:
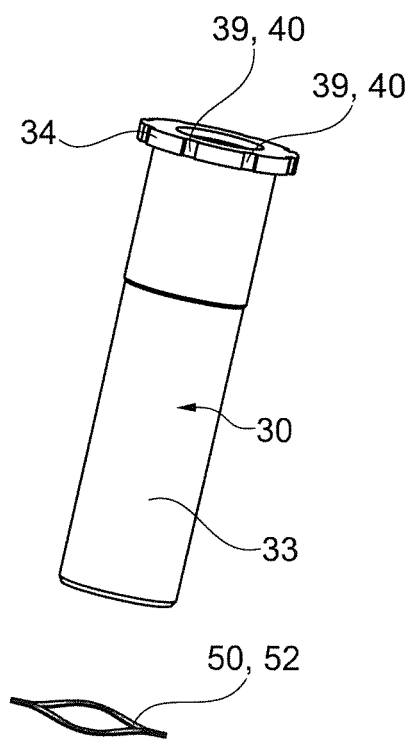
Figure 5:
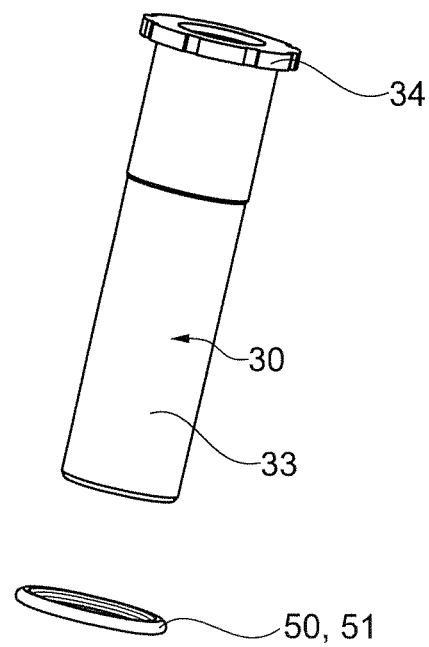
Figure 6:
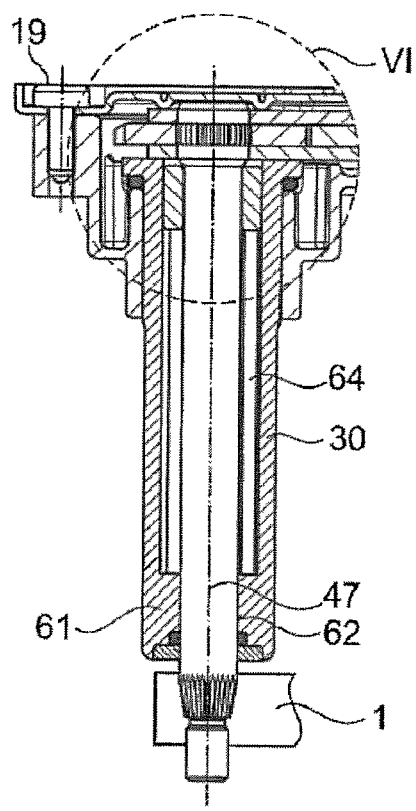
Figure 7:
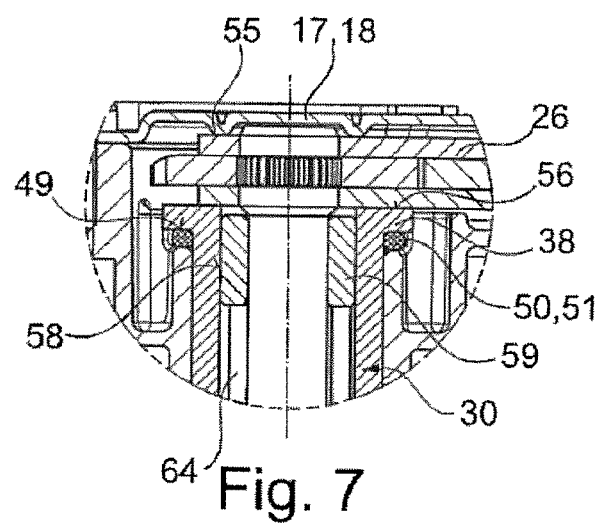
Figure 8:
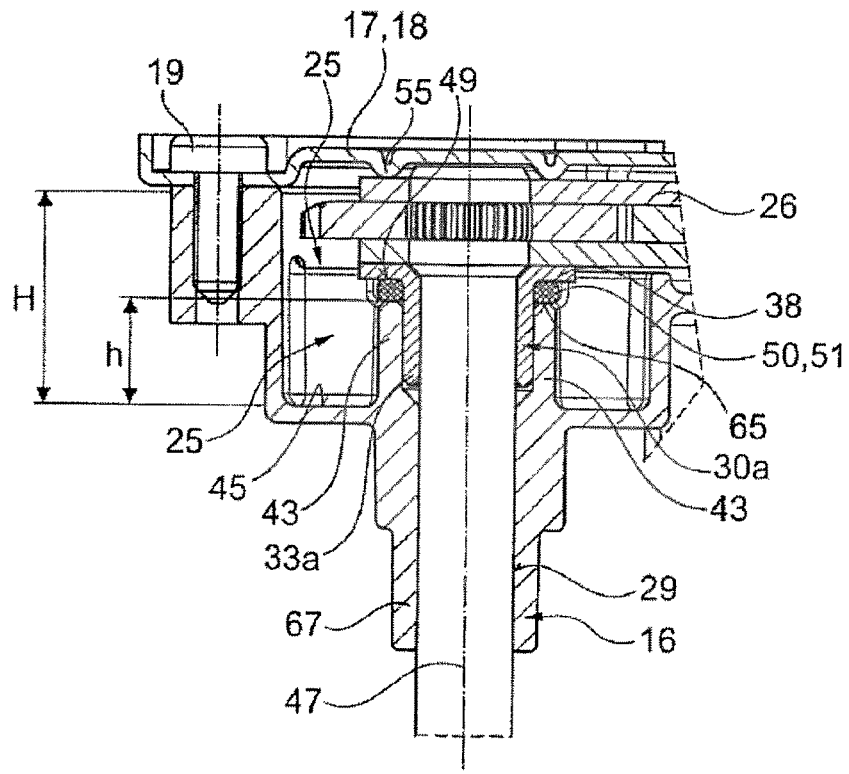
Figure 10:
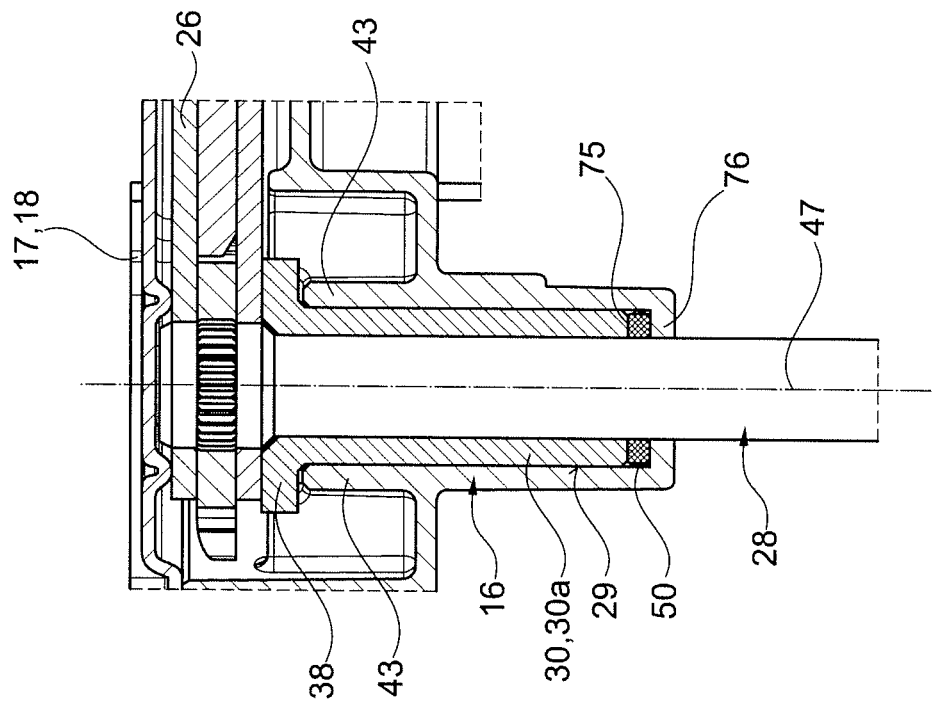
Figure 9:
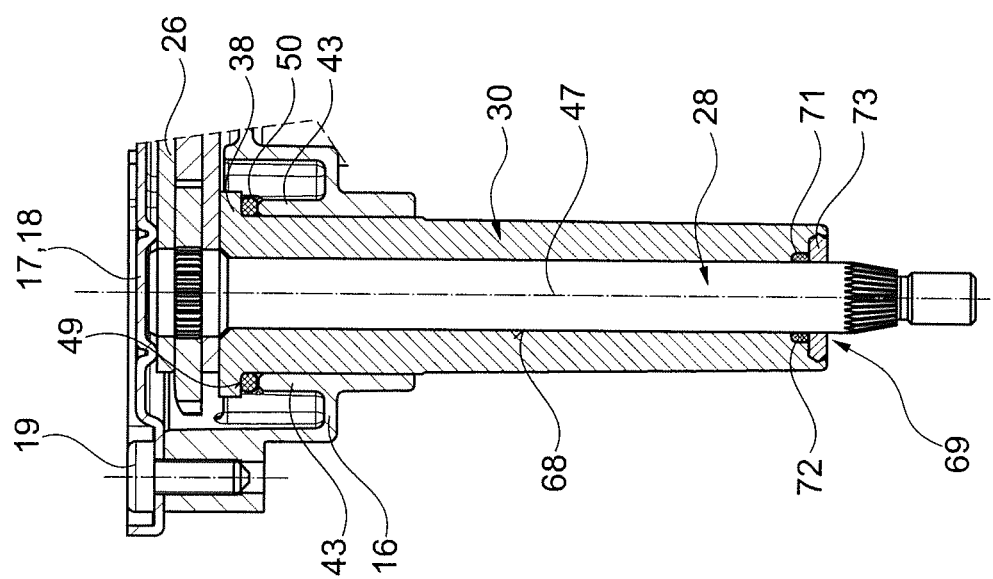

In the drawing:

FIG. 1 shows the components of a wiper motor according to the invention in an exploded illustration, FIG. 2 to FIG. 5 each show, in a perspective illustration, differently configured bearing elements for a shaft with differently configured axial compensating elements, FIG. 6 shows a cut-out of a mounted wiper motor in the region of the bearing element, in longitudinal section, FIG. 7 shows a detail of FIG. 6 in an enlarged illustration, FIG. 8 shows an illustration corresponding to FIG. 7 with a modified bearing element, and FIG. 9 and FIG. 10 show illustrations corresponding to FIG. 7 with bearing elements modified once again.

Identical elements or elements with the same function are provided with the same reference numbers in the figures.

The wiper motor 10 illustrated in an exploded illustration in FIG. 1 serves in particular, but not restrictively, for driving a wiper arm 1, which is only partially illustrated in FIG. 6. A wiper blade (not illustrated) is fastened to the wiper arm 1, wherein the wiper motor 10 is preferably arranged in the rear region of a motor vehicle.

The wiper motor 10 has an electric motor 11 which is flange-mounted on a gear housing 15 which is at least partially composed of metal. In the exemplary embodiment illustrated, the gear housing 15 has a cup-like first housing element 16, onto which the electric motor 11 is flanged-mounted, and a second housing element 17 in the form of a housing cover 18. In the exemplary embodiment illustrated, the two housing elements 16, 17 are formed from metal, wherein the first housing element 16 is designed as a pressure casting composed of aluminium, and a second housing element 17 or the housing cover 18 is designed as a punched/bent part composed of sheet metal. The housing cover 18 or the second housing element 17 is connected to the first housing element 16 by way of example via four fastening screws 19 which can be seen in FIG. 1. Furthermore, the housing cover 18 has by way of example three fastening arms 21, on the end regions of which are arranged bearing blocks 22 which are each of elastic design and via which the housing cover 18, and therefore the wiper motor 10, is fastenable to a body structure, for example to a tailgate of the motor vehicle.

The first housing element 16 forms a receiving space 25 for receiving a gear which is of single-stage or multi-stage design and is driven by the electric motor 11. The gear (not illustrated specifically) acts on a lever mechanism 26 which is connected to a shaft 28 serving as an output element. That end of the shaft 28 which lies opposite the lever mechanism 26 is connected in turn outside the gearing housing 15 to the wiper arm 1.

For the guiding of the shaft 28 out of the gear housing 15 or the first housing element 16, the first housing element 16 has an opening 29 which is designed in the form of a passage opening, wherein the shaft 28 projects through the opening 29. Furthermore, a sleeve-shaped element 30 which radially surrounds the shaft 28 and is in the form of a bearing sleeve 31 is provided between the opening 29 and the shaft 28.

The element 30 which is designed as a plastic injection-moulded part has at least two different cross-sections 33, 34. While the first cross-section 33 is of round design and has a diameter which is matched to the diameter of the opening 29 in the first housing element 16 in such a manner that a fit is formed between the outer circumference of the first cross-section 33 and the opening 29, said fit (loose fit) permitting manual introduction of the element 30 into the opening 29 without increased effort, the second cross-section 34 has a larger cross-section at least in regions. The second cross-section 34 is arranged here on the front side 36 of the element 30, said front side facing the receiving space 25 or the housing cover 18. The second cross-section 34 has, by way of example, an edge 38 which is radially encircling in the manner of a flange and preferably has, at equal angular distances from one another, a plurality of receptions 39 which are formed in the longitudinal direction as longitudinal slots 40. Said receptions 39 or longitudinal slots 40 cooperate with mating projections 42 in the form of longitudinal ribs 43 which are formed in the region of an inner wall 44 of the first housing element 16 in the receiving space 25. Also formed between the receptions 39 and the elevations 42 is, for example, a loose fit in order to permit simple manual mounting of the element 30 without effort. The height h of the longitudinal ribs 43 is smaller here than the height H of the receiving space 25 in the region of the longitudinal ribs 43. The longitudinal ribs 43 reach here as far as a bottom region 45 of the receiving space 25 or emerge from the bottom region 45 (FIG. 8).

When the element 30 is introduced axially or guided through the opening 29, the element 30 can be pushed with its first cross-section 33 through the opening 29 from the direction of the receiving space 25, i.e. from the interior space of the gear housing 15, until the second cross-section 34 with its receptions 39 enters into operative connection with the longitudinal ribs 43 which firstly position the element 30 radially within the first housing element 16 and secondly, upon indirect contact of the edge 38 against the bottom region 45 or in the region of the front side of the longitudinal ribs 43 facing the edge, limit the axial displaceability of the element 30 or ensure that the element 30 is axially fixed within the opening 29 via the second cross-section 34.

In order to compensate for component tolerances or in order to prevent the element 30 being arranged along its longitudinal axis 47 with movement play (axial play) in the end position of the element 30 when the wiper motor 10 is mounted, an elastically deformable compensating element 50 is provided which, in the case of the exemplary embodiment illustrated in FIG. 1, is composed of an elastic material, such as rubber or an elastomer, and is in the form of an O ring 51. The O ring 51 can be pushed onto the circumference of the first cross-section 33 and has a smaller diameter than the second cross-section 34, and therefore, when the wiper motor 10 is mounted, the second cross-section 34 or the edge 38 lies against the bottom region 45 of the first housing element 16 with the axial interposition of the compensating element 50. In the installed state, the compensating element 50 lies, for example, against the lower side or end side 49 of the edge 38 or of the second cross-section 34 located towards the first cross-section 33.

Figure 2:
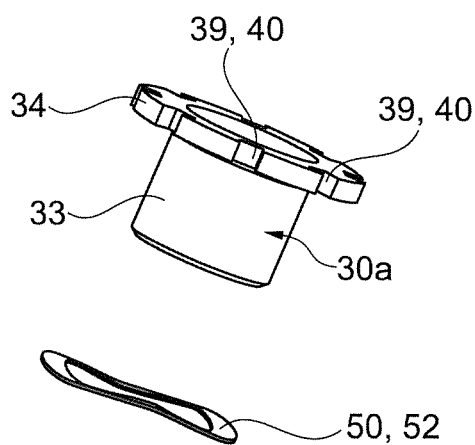
Figure 3:
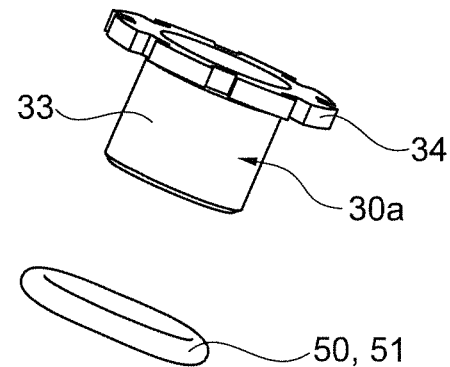

The element 30a illustrated in FIGS. 2 and 3 has a shortened axial overall length in comparison to the element 30 illustrated in FIGS. 1, 4 and 5. Whereas, in the illustrations of FIGS. 3 and 5, the compensating element 50 is in each case formed as an O-ring 51, in the illustrations of FIGS. 2 and 4, the compensating element 50 is in each case designed as a metallic element in the form of a spring washer 52.

It can be seen with reference to FIGS. 6 and 7 that the housing cover 18 or the second housing element 17 presses with a radially encircling projection 55, in the form of a bead, via the lever mechanism 26 onto the upper side 56 of the edge 38 of the element 30 and therefore loads the element 30 with an axial force in such a manner that the compensating element 50 is elastically deformed. Furthermore, it can be seen with reference in particular to FIG. 7 that the element 30 has, on the side facing the edge 38, a reception 58 which is of increased diameter and is intended for receiving a separate bearing body 59 which in turn radially surrounds the shaft 28 or serves for the radial mounting of the shaft 28. The bearing body 59 is composed of a material different from the material of the element 30, for example bronze or similar.

It can moreover be seen in particular with reference to FIG. 6 that the element 30 has, on the side facing the wiper arm 1, a portion 61 with a passage opening 62, the inside dimeter of which is matched to the outside diameter of the shaft 28, and therefore the shaft 28 is guided radially in the region of the portion 61 directly through the portion 61. By contrast, the inside diameter of the element 30 between the portion 61 and the bearing body 59 is increased in such a manner that a radial gap 64 is formed there between the shaft 28 and the element 30.

Application FIG. 8 shows an exemplary embodiment using the element 30a which, in comparison to the element 30, has, as explained above, a smaller axial extent or overall length. In particular, it can firstly be seen with reference to FIG. 8 (in the same manner as with reference to FIGS. 6 and 7) that the compensating element 50, which is in each case formed as the O-ring 51, lies axially between the edge 38 and the end face 30 65 of the longitudinal ribs 43 facing the edge 38, and that furthermore the element 30a is completely accommodated with its first cross-section 33a within the opening 29 of the first housing element 16. For this purpose, the first housing element 16 has a stub 35 shaped region 67 which embraces the shaft 28 radially with little bearing play, and therefore the shaft 28 is guided radially substantially only by means of the element 30a. Furthermore, it can be seen with reference to FIG. 8 that the opening 29 in the region of the region 67 has a reduced inside diameter in comparison to the region in which the element 30a is accommodated.

FIG. 9 illustrates the situation in which, with the use of an element 30, the shaft 28 within virtually the entire region of the element 30 lies against the element 30 radially on the inner wall 68 thereof, or is guided radially by said element. Furthermore, an outlet region 69 of the shaft 28 from the element 30 has, in the region of the element 30, a sealing element 71 which radially surrounds the shaft 28 and lies against the bottom of a recess 72. The recess 72 is closed towards the outside by means of a closure element 73, wherein the closure element 73 serves at the same time for securing the sealing element 71 in the recess 72.

Finally, FIG. 10 illustrates the situation in which, with the use of the element 30, 30a, the compensating element 50 lies axially on the end face 75 of the element 30, 30a lying opposite the edge 38 and is supported axially on a radially inwardly projection portion 76 of the first housing element 16.

During the mounting of the wiper motor 10, the compensating element 50 is either pushed over the first cross-section 33, 33a of the element 30, 30a, or else, according to the exemplary embodiment according to FIG. 10, is introduced into the opening 29 as far as the portion 76. The element 30, 30a is subsequently pushed into the opening 29 as far as an axial intermediate position in which the compensating element 50 is not yet elastically deformed. During the further course of the mounting, the compensating element 50 is elastically deformed by the mounting and axial loading with force by the housing cover 18, and therefore the element 30, 30a reaches its axial end position in which there is no longer any axial play between the first housing element 16 and the element 30; 30a.

The wiper motor 10 described to this extent or the element 30, 30a and the compensating element 50 can be modified in various ways without departing from the inventive concept.

LIST OF REFERENCE SIGNS

1 Wiper arm
10 Wiper motor
11 Electric motor
15 Gear housing
16 First housing element
17 Second housing element
18 Housing cover
19 Fastening screw
21 Fastening arm
22 Bearing block
25 Receiving space
26 Lever mechanism
28 Shaft
29 Opening
30, 30a Element
31 Bearing sleeve
33, 33a Cross-section
34 Cross-section
36 Front side
38 Edge
39 Reception
40 Longitudinal slot
42 Projection
43 Longitudinal rib
44 Inner wall
45 Bottom region
47 Longitudinal axis
49 End face
50 Compensating element
51 O-ring
52 Spring washer
55 Projection
56 Upper side
58 Reception
59 Bearing body
61 Portion
62 Passage opening
64 Radial gap
65 End surface
67 Region
68 Inner wall
69 outlet region
71 Sealing element
72 Recess
73 Closure element
75 End surface 76 Portion
h Height
H Height

The invention claimed is:

1. A wiper motor, comprising:
a shaft that extends in a longitudinal direction and that drives a wiper arm at one end, another end of the shaft being arranged in a gear housing,
wherein the shaft projects through an opening of the gear housing and in a region of the opening, the shaft is mounted radially in a bore in a sleeve-shaped element,
wherein the sleeve-shaped element is fixed axially in the region of the gear housing, and
whereby the sleeve-shaped element has two different cross-sections, a first cross-section which protrudes axially through the opening and a second cross-section which is axially fixed within said opening or within a receiving space of said gear housing,
wherein an elastically deforming compensating element is located directly between a portion of the sleeve-shaped element and a portion of the gear housing in the longitudinal direction, whereby the compensating element compensates an axial play located in the longitudinal direction of the sleeve-shaped element between the sleeve-shaped element and the gear housing,
wherein the elastically deforming compensating element prevents direct contact between the sleeve-shaped element and the gear housing in the longitudinal direction while maintaining contact in a radial direction,
wherein the opening is formed by a part of the receiving space of the gear housing on the side of the sleeve-shaped element located towards the second cross-section, and
wherein the receiving space has a fastening area for the second cross-section of the sleeve-shaped element, and the fastening area has at least one projection which extends radially inwards, formed as a rib, which projection cooperates in a form-fitting manner with a reception located at the second cross-section of the sleeve-shaped element.

2. The wiper motor according to claim 1, wherein the compensating element is ring-shaped and radially embraces the sleeve-shaped element in the area of the first cross-section or is located at a front side of the sleeve-shaped element.

3. The wiper motor according to claim 1, wherein the compensating element consists of metal and is formed as a spring washer.

4. The wiper motor according to claim 1, wherein the compensating element is formed as an O-ring.

5. The wiper motor according to claim 1, wherein the compensating element lies against an end face of the second cross-section located towards the first cross-section.

6. The wiper motor according to claim 1, wherein the at least one projection extends only over a part of the height of the receiving space.

7. The wiper motor according to claim 1, wherein the second cross-section with the reception on the sleeve-shaped element is formed on a front side of the sleeve-shaped element.

8. The wiper motor according to claim 1, wherein the sleeve-shaped element is formed as a plastic injection moulded part.

9. The wiper motor according to claim 1, wherein the compensating element is axially loaded indirectly with a deforming force from a gear housing element.

10. A method for the production of the wiper motor of claim 1, the method comprising:
introducing the sleeve-shaped element into the opening of the gear housing up to an axial intermediate position;
wherein the introducing of the sleeve-shaped element takes place from an inner side of the gear housing; and
before the introducing step, the compensating element is positioned on the first cross-section of the sleeve-shaped element or the compensating element is introduced into the opening.

11. The method according to claim 10, wherein after the introducing of the sleeve-shaped element into its axial intermediate position the compensating element is deformed elastically by mounting a gear housing element thereby moving the sleeve-shaped element into an axial end Position.

12. A wiper motor, comprising:
a shaft that extends in a longitudinal direction and that drives a wiper arm at one end, another end of the shaft being arranged in a gear housing,
wherein the shaft projects through an opening of the gear housing and in a region of the opening, the shaft is mounted radially in a bore in a sleeve-shaped element,
wherein the sleeve-shaped element is fixed axially in the region of the gear housing, and
whereby the sleeve-shaped element has two different cross-sections, a first cross-section which protrudes axially through the opening and a second cross-section which is axially fixed within said opening or within a receiving space of said gear housing,
wherein an elastically deforming compensating element is located directly between a portion of the sleeve-shaped element and a portion of the gear housing in the longitudinal direction, whereby the compensating element compensates an axial play located in the longitudinal direction of the sleeve-shaped element between the sleeve-shaped element and the gear housing,
wherein the opening is formed by a part of the receiving space of the gear housing on the side of the sleeve-shaped element located towards the second cross-section, and
wherein the receiving space has a fastening area for the second cross-section of the sleeve-shaped element, and that the fastening area has at least one projection which extends radially inwards, formed as a rib, which projection cooperates in a form-fitting manner with a reception located at the second cross-section of the sleeve-shaped element.

13. A wiper motor, comprising:
a shaft that extends in a longitudinal direction and that drives a wiper arm at one end, another end of the shaft being arranged in a gear housing,
wherein the shaft projects through an opening of the gear housing and in a region of the opening, the shaft is mounted radially in a bore in a sleeve-shaped element,
wherein the sleeve-shaped element is fixed axially in the region of the gear housing, and
whereby the sleeve-shaped element has two different cross-sections, a first cross-section which protrudes axially through the opening and a second cross-section which is axially fixed within said opening or within a receiving space of said gear housing,
wherein an elastically deforming compensating element is located directly between a portion of the sleeve-shaped element and a portion of the gear housing in the longitudinal direction, wherein the opening is formed by a part of the receiving space of the gear housing on the side of the sleeve-shaped element located towards the second cross-section, and wherein the receiving space has a fastening area for the second cross-section of the sleeve-shaped element, and that the fastening area has at least one projection which extends radially inwards, formed as a rib, which projection cooperates in a form-fitting manner with a reception located at the second cross-section of the sleeve-shaped element.

14. The wiper motor according to claim 13,
wherein the second cross-section of the sleeve-shaped element is fully located within the receiving space of the gear housing.

15. The wiper motor according to claim 13,
wherein the first cross-section of the sleeve-shaped element extends partially out of the gear housing.

\* \* \* \* \*